United States Patent [19]

Takeshita et al.

[11] Patent Number: 4,481,891

[45] Date of Patent: Nov. 13, 1984

[54] APPARATUS FOR RENDERING PCB VIRULENCE-FREE

[75] Inventors: Shigeo Takeshita, Yokohama; Yoshiaki Kitamura, Miyamacho, both of Japan

[73] Assignee: Kabushiki Kaisah Kitamuragokin Seisakusho, Gifu, Japan

[21] Appl. No.: 518,134

[22] Filed: Jul. 28, 1983

[30] Foreign Application Priority Data

Jul. 30, 1982 [JP] Japan .............................. 57-132059

[51] Int. Cl.³ .............................................. F23G 7/04
[52] U.S. Cl. ................................. 110/238; 110/215; 110/346
[58] Field of Search ............... 110/341, 238, 346, 235, 110/236, 237, 248, 215; 423/481

[56] References Cited

U.S. PATENT DOCUMENTS 4,230,053 10/1980 Deardorff et al. .................. 110/346
4,398,475  8/1983 McKiel, Jr. ......................... 110/346
4,402,274  9/1983 Meenan et al. ..................... 110/237

*Primary Examiner*—Edward G. Favors

[57] ABSTRACT

A method and apparatus for rendering PCB virulence-free is provided. The PCB to be treated is pre-heated with exhaust heat before it is introduced into a combustion furnace to facilitate the reaching of its boiling point, and the pre-heated PCB is caused to ascend through a layer of mineral particles disposed in the furnace, the mineral particles being of a porous multi-element mineral, the furnace interior and particularly the mineral particle layer being pre-heated to a temperature above 1,100° C. from a different heat source. During consecutive reaction processes of gasification, dissociation and combustion of PCB brought about as PCB ascends through the mineral particle layer, the thermal dissociation into benzene ring and chlorine and further combustion of benzene ring are promoted by the catalytic actions of adsorption to mineral particle's large porous surface, catalytic cracking of multi-element oxides present in arranged fashion on the pore surface of mineral particles and surface combustion. This has an equivalent effect to extending the retention time in a high temperature atmosphere at a high temperature preferably above 1,100° C.

1 Claim, 2 Drawing Figures

APPARATUS FOR RENDERING PCB VIRULENCE-FREE

BACKGROUND OF THE INVENTION

This invention relates to a method of removing the virulence of polychloride biphenyl (hereinafter referred to as PCB) and an apparatus for carrying out the same method.

It is well known in the art that PCB is very strongly virulent to man and animals. PCB has superior heat resistance, chemical resistance and electric insulating property and thus finds extensive applications to insulators of capacitors and transformers, heat media for thermal processing, additives for paints and printing inks, etc. Its production only in Japan from 1954 to 1960 amounts to several tenthousand tons. Of this output, approximately one half has been used for the products noted. Therefore, PCB now occurs in every environment and constitutes a source of pollution.

Efforts have been paid to remove the virulence of PCB. However, no appropriate method and apparatus to this end have been realized.

SUMMARY OF THE INVENTION

The invention has been intended in the light of the above affairs, and its object is to provide a simple method and apparatus for reliably rendering PCB virulence-free.

It has been known that PCB can be thermally dissociated into benzene ring and chlorine by heating it to a temperature of approximately 1,100° C. or above. In this case, the benzene ring is further oxidized into $CO_2$ and $H_2O$ which are discharged as chlorine gas via an exhaust gas duct. The process of making PCB perfectly vilurence-free, therefore, is not allowed to discharge even a slight quantity of imperfectly dissociated PCB, i.e., a steam of highly heat-resistant PCB. In addition, $Cl_2$ and HCl gases that also result from the thermal treatment must be appropriately absorbed and neutralized and thereby prevented from the escapement into the atmosphere.

For PCB to reliably dissociated and combusted in a furnace, it is essential that the furnace temperature be reliably held above 1,100° C. at all time and also that PCB be retained in the furnace for a period of time necessary until it is perfectly dissociated into benzene ring and chlorine. Usually, the period of a chemical reaction can be reduced by a catalytic action. The retention time thus can be reduced by accelerating the reaction with a catalyst which is effective for a series of chemical reactions.

In order to meet the prerequisites noted above, according to the invention the PCB to be treated is preheated with exhaust heat before it is introduced into a combustion furnace to facilitate the reaching of its boiling point, and the pre-heated PCB is caused to ascend through a layer of mineral particles disposed in the furnace, the mineral particles being of a porous multi-element mineral, the furnace interior and particularly the mineral particle layer being pre-heated to a temperature above 1,100° C. from a different heat source. During consequtive reaction processes of gasification, dissociation and combustion of PCB brought about as PCB ascends through the mineral particle layer, the thermal dissociation into benzene ring and chlorine and further combustion of benzene ring are promoted by the catalytic actions of adsroption to mineral particle's large porous surface, catalytic cracking of multi-element oxides present in arranged fashion on the pore surface of mineral particles and surface combustion. This has an equivalent effect to extending the retention time in a high temperature atmosphere at a high temperature preferably above 1,100° C.

BRIEF DESCRIPTION OF THE DRAWINGS

The drawings illustrate an embodiment of the PCB vilulence removal apparatus according to the present invention in which.

and

Figure 1:
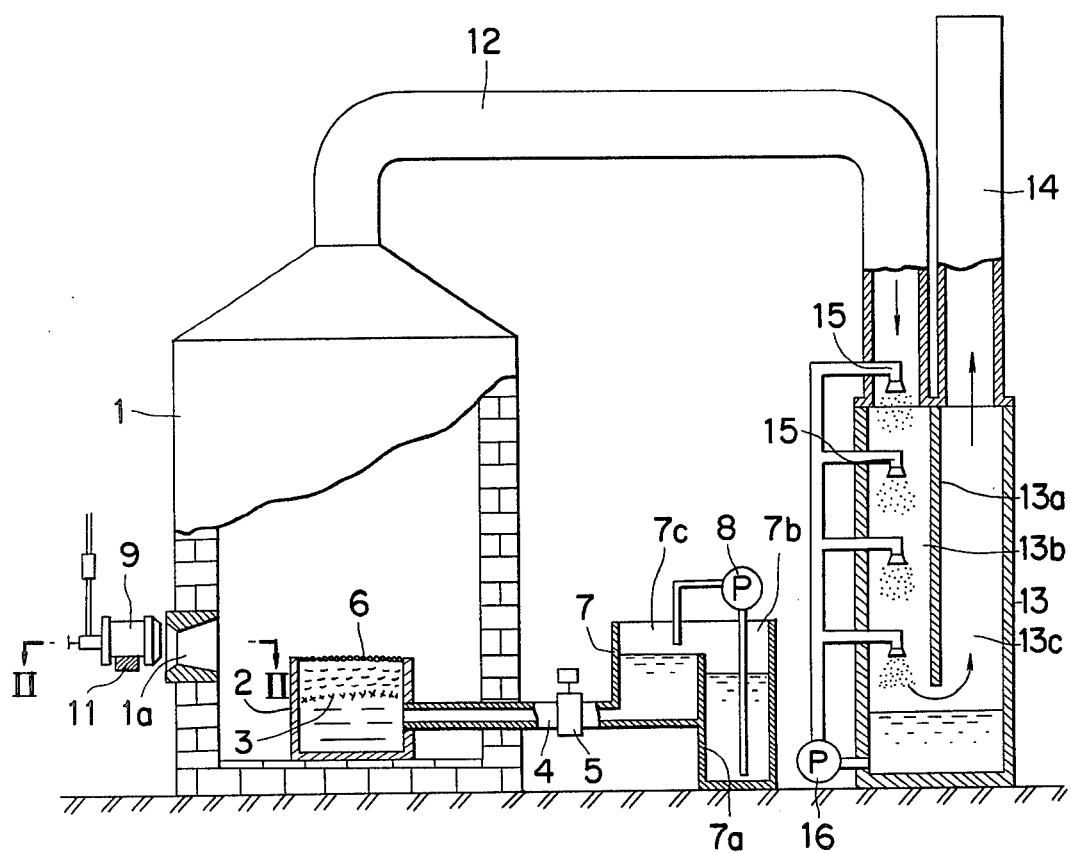
FIG. 1 is a pictorial elevational view, partly in section.
Figure 2:
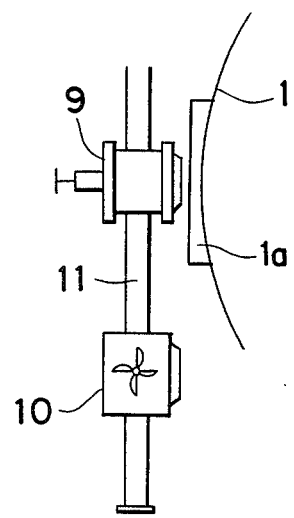

FIG. 2 is a sectional view taken along line II—II of FIG. 1.

DETAILED DESCRIPTION OF THE EMBODIMENTS

An embodiment of the apparatus according to the invention will now be described with reference to the accompanying drawings.

Referring to the Figures, a combustion furnace 1 has a burner/fan hole 1a formed in its peripheral wall. A combustion vessel 2 is disposed in the furnace 1 at a fixed position. It has a grid 3 provided at a vertically intermediate position. A fluid duct 4 is connected to one side wall of the combustion vessel 2 at a position thereof below the grid 3. The fluid duct 4 penetrates the fluid duct 4 and is communicated with replenishment tank 7c to be described later via an on-off valve 5 such as an electromagnetic valve. The combustion vessel 2 contains a layer of catalyst particles 6.

Naturally occurring minerals include those which are porous in structure and contain a large number of different elements. Such natural minerals may be used in situ as catalysts or may be imparted with catalytic functions through thermal oxidation treatments. Further, pumice, zeolite and like natural minerals and mordenite and like artificially synthesized minerals, which consist of a single element but the porous body of which is impregnated with worthwhile metal salt solutions, may be converted into carriers having newly imparted catalytic functions by means of sintering. It is well known that metal oxides have oxidizing or reducing catalytic functions. These metal oxides and their composite systems are roughly classified into solid acids proton donor, electron pair solid solution and solid bases. By way of example, oxides of aluminum, magnecium, calcium, barium, strontium, beryllium, zinc, iron, copper, molybdenum, vanadium, cobalt and many other elements are used in practice either in situ or as composite systems. Natural multi-element minerals have more complicated structures. Mostly, they have microspaces or microgaps formed in their crystal grains. Microscopically they are physically and chemically activated as solid acids, solid bases or crystal grains. Microscopically, they also have point, line and plane defects where energy for promoting chemical reactions is stored, which energy can accelerate the reactions.

A PCB tank 7 has a central partition wall 7a between a supply tank section 7b and a replenishment tank section 7c. The top of the partition wall 7a is substantially at the same level as the top of the combustion vessel 2. When the on-off valve 5 is opened, PCB in the replenishment tank section 7c flows into the combustion vessel 2 up to the top thereof. PCB being withdrawn from the supply tank section 7b and discharged into the replenishment tank section 7c by a pump 8 can overflow over the partition wall 7c into the supply tank section 7c. Therefore, PCB supplied to the combustion vessel 2 will never overflow over the top thereof.

A burner 9 and a fan 10 are attached to a guide rod 11, and can be moved in unison therewith. The burner 9 is held in opposition to the burner/fan hole 1a of the furnace 1 until the temperature of the interior thereof is elevated to 1,100° C. necessary for the combustion of PCB. When the PCB is combusted so that only air supply now is necessary, the burner 9 is turned off, and the fan 10 is brought to the position in opposition to the burner/fan hole 1a.

The top of the furnace 1 communicates with an end of an exhaust duct 12. The other end of the exhaust duct 12 communicates with the top of a gas treatment tank 13, in which chlorine contained in the exhaust gas fed through the exhaust duct 12 is removed. The gas treatment chamber 13 has a partition wall 13a between a shower chamber 13b and an exhaust chamber 13c. A flue 14 extends from the top of the exhaust chamber 13c. A bottom portion of the gas treatment tank 13 is filled with an alkaline neutralizing solution.

The alkaline neutralizing solution in the gas treatment tank 13 is withdrawn by a pump 16 and sprayed from a plurality of (four in the instant embodiment) shower nozzles 15 disposed in the exhaust duct 12 and shower chamber 13 against the exhaust gas.

The virulence removal method that is carried out using the apparatus described above will now be described.

Initially, the on-off valve 5 is held closed, that is, the fluid duct 4 leading to the combustion vessel 2 in the furnace 1 is not filled with PCB. In this state, the temperature of the furnace interior is elevated by operating the burner 9. When it is confirmed that the furnace interior temperature has been increased to 1,100° C., the on-off valve 5 is opened, whereby PCB is introduced through the fluid duct 4 into a portion of the combustion vessel 2 under the grid 3. The PCB is pre-heated by the exhaust heat. Since the liquid level of the replenishment tank section 7c is substantially the same as the top surface level of the catalyst particle layer in the furnace 1, the introduced PCB automatically ascends past the grid 3 up to the top surface of the catalyst particle layer 6. By this time, PCB reaches its boiling point due to its pre-heating and its exposure to the high temperature of the furnace interior. The gasified PCB is adsorbed to the porous surface of the catalyst 6. Since the catalyst 6 itself has been pre-heated to a temperature above 1,100° C., the dissociation temperature of PCB, the dissociated benzene rings are combusted by oxygen in air supplied from the fan 10 substituted for the burner 10, while chlorine is mostly discharged as $Cl_2$ into the exhaust gas. The molecular structure of PCB has two benzene rings and 10 hydrogen atoms. Theoretically, all the 10 hydrogen atoms can be substituted for by chlorine. However, in the PCB that actually prevails all the hydrogen atoms are not substituted. The remaining hydrogen atoms may give rise to a reaction $$2H + O_2 \rightarrow H_2$$

and hence to such reactions as $$H_2O + Cl_2 \rightarrow 2HCl + O_2$$

and $$H_2O + Cl_2 \rightarrow HCl + HClO.$$

The exhaust gas containing chlorine in the forms noted is fed through the exhaust duct 12 into the shower chamber 13b of the gas treatment chamber 13. In the shower chamber the chlorine contained in the exhaust gas is completely absorbed and neutralized by the spray of alkaline neutralizing solution issuing from the shower nozzles 15 and contact with the surface of the alkaline neutralizing solution. The resultant clean air is discharged into atmosphere through the flue 14. The neutralizing action is represented, for instance, as $$2NaOH + Cl_2 \rightarrow 2NaCl + H_2O + O_2,$$

$$Ca(OH)_2 + Cl_2 \rightarrow CaCl_2 + H_2O + O_2,$$

and $$HCl + NaOH \rightarrow NaCl + H_2.$$

The gas treatment system may be well-known system as well.

In the event if the furnace interior temperature is likely to become lower than 1,100° C. during operation, the burner 9 is immediately substituted and operated to elevate the temperature. It is essential to maintain the furnace interior temperature to be above 1,100° C. Further, the mineral used as the catalyst particles, either natural or artificial, must have as high heat resistance as possible so that its porous structure will not be readily thermally disintegrated by high temperatures above 1,100° C.

As has been described in the foregoing, catalyst particles which can produce metal oxides and function as an oxidizing thermolytic catalyst are pre-heated to a temperature above the dissociation temperature of PCB and PCB is supplied to the pre-heated catalyst particles for combustion to thereby remove the virulence, the virulence thus can be reliably removed. In addition, the PCB virulence removal apparatus according to the invention has a simple construction and thus permits reduction of the equipment cost.

What is claimed is:
1. An apparatus for rendering PCB virulence-free comprising:
   a combustion furnace;
   a combustion vessel disposed at the substantial center of said combustion furnace;
   a grid provided in said combustion vessel and dividing the interior thereof into an upper and lower section;
   catalyst particles provided as a layer in said upper section of said combustion vessel;
   a PCB tank communicating with said lower section of said combustion vessel, for filling said combustion vessel with a constant quantity of PCB;
   a burner and a fan interchangeably brought to a position in opposition to an opening of said combustion furnace; and
   a gas treatment tank communicated with said combustion furnace via an exhaust duct, for absorbing and neutralizing chlorine gas contained in exhaust gas fed through said exhaust duct.

* * * * *